US007662514B2

(12) United States Patent
Bito et al.

(10) Patent No.: US 7,662,514 B2
(45) Date of Patent: Feb. 16, 2010

(54) NON-AQUEOUS ELECTROLYTE SECONDARY BATTERY AND METHOD FOR PRODUCING NEGATIVE ELECTRODE MATERIAL FOR NON-AQUEOUS ELECTROLYTE SECONDARY BATTERY

(75) Inventors: Yasuhiko Bito, Osaka (JP); Teruaki Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 11/600,069

(22) Filed: Nov. 16, 2006

(65) Prior Publication Data

US 2007/0111100 A1 May 17, 2007

(30) Foreign Application Priority Data

Nov. 17, 2005 (JP) ............................. 2005-332367

(51) Int. Cl.
*H01M 4/58* (2006.01)
*H01M 4/36* (2006.01)
*H01M 4/00* (2006.01)

(52) U.S. Cl. ................ 429/231.9; 29/623.1; 429/218.1; 429/226; 429/220; 429/221; 429/223; 429/231.95

(58) Field of Classification Search ................. 429/209, 429/218.1, 229, 31.5, 231.9, 231.95; 148/100, 148/421, 426, 432; 29/623.1–623.5; 252/182.1
See application file for complete search history.

(56) References Cited

U.S. PATENT DOCUMENTS 6,090,505 A 7/2000 Shimamura et al.
2004/0062990 A1* 4/2004 Shimamura et al. ...... 429/218.1

FOREIGN PATENT DOCUMENTS

| JP | 2000-173616 | 6/2000 |
| JP | 2004-103340 | 4/2004 |
| JP | 2004-335272 | 11/2004 |

* cited by examiner

*Primary Examiner*—Dah-Wei D Yuan
*Assistant Examiner*—Claire L Rademaker
(74) *Attorney, Agent, or Firm*—McDermott Will & Emery LLP (57) ABSTRACT

A non-aqueous electrolyte secondary battery including a positive electrode capable of reversibly absorbing and desorbing lithium, a negative electrode including an alloy material as an active material, and a non-aqueous electrolyte, wherein the alloy material includes a phase (phase A) containing at least Si and a phase (phase B) containing an intermetallic compound composed of Si and at least one selected from the group consisting of Ti, Zr, Ni and Cu, and the alloy material contains 0.0006 to 1.0 wt % of Fe in a metallic state.

2 Claims, 2 Drawing Sheets

NON-AQUEOUS ELECTROLYTE SECONDARY BATTERY AND METHOD FOR PRODUCING NEGATIVE ELECTRODE MATERIAL FOR NON-AQUEOUS ELECTROLYTE SECONDARY BATTERY

FIELD OF THE INVENTION

The present invention relates to a non-aqueous electrolyte secondary battery, and particularly to an improvement of a negative electrode therefor. More particularly, this invention relates to an improved alloy material comprising Si and a transition metal.

BACKGROUND OF THE INVENTION

Non-aqueous electrolyte secondary batteries can achieve high voltage and high energy density. For this reason, they have been vigorously investigated. The positive electrodes of non-aqueous electrolyte secondary batteries under investigation comprise a transition metal oxide or transition metal chalcogenide such as $LiMn_2O_4$, $LiCoO_2$, $LiNiO_2$, $V_2O_5$, $Cr_2O_5$, $MnO_2$, $TiS_2$ or $MoS_2$. These oxides and compounds have a layered or tunnel-like crystal structure through which lithium ions can migrate freely. The negative electrodes, on the other hand, comprise a carbon material capable of reversibly absorbing and desorbing lithium that is excellent in terms of cycle life and safety. Currently, lithium ion batteries whose negative electrode comprises a graphite-based carbon material are commercially available.

Graphite materials, however, have a relatively low theoretical capacity of 372 mAh/g and a relatively low theoretical density of 2.2 g/cm$^3$. Accordingly, what is desired is a metal material for use in negative electrodes capable of achieving higher capacity than graphite materials. Among the candidate materials therefor, particularly, silicon (Si), which has a high capacity of 4199 mAh/g (theoretical density: 2.33 g/cm$^3$), has been under extensive research and development.

Although Si is considered the most promising negative electrode material for achieving high capacity, the use of Si in a battery impairs the charge/discharge cycle characteristics of the battery. More specifically, during charge and discharge reactions, Si repeatedly expands and contracts along with the absorption and desorption of lithium. This increases the contact resistance among particles inside the negative electrode and degrades the current collecting network. The degradation of current collecting network can be a major factor in shortening charge/discharge cycle life.

In order to solve the above problems, various proposals have been made. For example, U.S. Pat. No. 6,090,505 (Patent Document 1) and Japanese Laid-Open Patent Publication No. 2004-103340 (Patent Document 2) propose, as a negative electrode material, an alloy material capable of reversibly absorbing and desorbing lithium comprising a solid phase A and a solid phase B having different compositions. In this alloy material, at least part of the solid phase A is covered with the solid phase B. The solid phase A comprises silicon, tin, zinc, etc. The solid phase B comprises a Group 2A element, a transition element, a Group 2B element, a Group 3B element, a Group 4B element, etc. The solid phase A is preferably amorphous or low crystalline.

Japanese Laid-Open Patent Publication No. 2004-335272 (Patent Document 3) discloses that improved cycle life can be attained by using a negative electrode material comprising at least two different phases: a phase A composed mainly of Si; and a phase B comprising a silicide composed of Si and a transition metal. This publication proposes that at least one of the phase A and the phase B is amorphous or low crystalline.

Japanese Laid-Open Patent Publication No. 2000-173616 (Patent Document 4) discloses that further improved cycle life can be attained by incorporating iron in the alloy in an amount of 0.002 wt % or more relative to the total amount of the alloy.

BRIEF SUMMARY OF THE INVENTION

The above prior art techniques are somewhat effective in that they significantly suppress the cracking of the alloy materials that occurs during expansion and contraction thereof as well as the degradation of current collecting network that causes the degradation of cycle characteristics. However, as a result of detailed analysis of storage characteristics in an overdischarged state, which is one of the important battery characteristics, it has been found that the above techniques cannot offer sufficient storage characteristics.

Moreover, for the purpose of further suppressing the degradation of cycle life, Patent Document 3 proposes so-called mechanical synthesis, a method of mechanically synthesizing an alloy, to form an amorphous or low crystalline phase in the alloy material. However, this document is silent on the Fe element contained in the alloy material. Furthermore, Patent Document 4 discloses a quenching technique to form the alloy material. Accordingly, the resulting alloy material is assumed to be crystalline. Although this patent document defines the amount of Fe relative to the total amount of the alloy material, it is silent on what chemical state the Fe is in, and it does not specifically disclose the mechanism by which the Fe improves the cycle characteristics.

In order to obtain a negative electrode material having excellent cycle characteristics as well as excellent storage characteristics in an overdischarged state, the present inventors vigorously investigated an alloy material including a phase A composed mainly of Si and a phase B comprising an intermetallic compound composed of Si and a transition metal in terms of the amount and chemical state of Fe contained in the alloy material. As a result, they found that optimizing the amount and chemical state of Fe contained in the alloy material is effective in achieving both excellent cycle characteristics and excellent storage characteristics in an overdischarged state. The present inventors further found that the chemical state of Fe contained in the alloy material can be determined by saturation magnetization measurement, and the amount of metallic Fe contained in the alloy material can be determined from a saturation magnetization obtained from the measurement.

The present invention provides a non-aqueous electrolyte secondary battery comprising a negative electrode obtained based on the above findings. More specifically, the non-aqueous electrolyte secondary battery of the present invention comprises a positive electrode capable of reversibly absorbing and desorbing lithium, a negative electrode comprising an alloy material as an active material, and a non-aqueous electrolyte, wherein the alloy material includes a phase (phase A) comprising at least Si and a phase (phase B) comprising an intermetallic compound composed of Si and at least one selected from the group consisting of Ti, Zr, Ni and Cu, and the alloy material contains 0.0006 to 1.0 wt % of Fe in a metallic state.

The present invention further provides a method for producing a negative electrode material for a non-aqueous electrolyte secondary battery comprising a step of producing an alloy material using a raw material containing Si, Fe and at least one transition metal element selected from the group consisting of Ti, Zr, Ni and Cu, the alloy material including a phase (phase A) comprising at least Si and a phase (phase B) comprising an intermetallic compound composed of Si and the at least one transition metal element, and containing Fe in a metallic state, wherein a saturation magnetization of the alloy material which varies according to the amount of Fe is detected during the step, and the step is terminated when the detected saturation magnetization reaches a specified value.

According to the present invention, it is possible to provide a non-aqueous electrolyte secondary battery having a high capacity, excellent charge/discharge cycle characteristics and excellent storage characteristics in an overdischarged state.

Because the present invention adjusts the amount of Fe in a metallic state to an appropriate level, when the battery is stored in an overdischarged state, the degradation of storage characteristics caused by the dissolution of Fe in a metallic state from the negative electrode is prevented. Presumably, this is attributed to the fact that the alloy material serving as a negative electrode active material possesses improved resistance during storage in an overdischarged state.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The non-aqueous electrolyte secondary battery of the present invention comprises a negative electrode comprising an alloy material as an active material. The alloy material includes a phase (phase A) comprising at least Si and a phase (phase B) comprising an intermetallic compound composed of Si and at least one selected from the group consisting of Ti, Zr, Ni and Cu, and the alloy material contains 0.0006 to 1.0 wt % of Fe in a metallic state.

When the amount of metallic Fe contained in the alloy material is less than 0.0006 wt %, it results in degraded cycle characteristics. When the amount exceeds 1.0 wt %, it results in degraded storage characteristics in an overdischarged state.

The alloy material serving as a negative electrode active material according to the present invention comprises a phase A composed mainly of Si and a phase B comprising an intermetallic compound composed of Si and at least one selected from the group consisting of Ti, Zr, Ni and Cu. This alloy material reduces the influence of expansion and prevents the degradation of electron conductivity of the negative electrode caused by the expansion and contraction of the alloy material. Accordingly, a negative electrode containing this alloy material yields a battery having a high capacity and excellent cycle characteristics.

As used herein, the phase A is a phase that serves to absorb and desorb Li and is capable of electrochemically reacting with Li. The phase A is composed mainly of Si. Preferably, the phase A is composed of Si simple substance. When the phase A comprises Si simple substance, the amount of Li that is absorbed and desorbed per unit weight or unit volume of the alloy material will increase significantly. Si simple substance, however, has poor electron conductivity because it is a semiconductor. Accordingly, it is effective to incorporate a small amount (up to about 5 wt %) of an additional element (e.g., phosphorus (P), boron (B), hydrogen (H)) or a transition metal element into the phase A.

The phase B, on the other hand, comprises an intermetallic compound comprising a transition metal element and Si. The intermetallic compound comprising silicon has high affinity with the phase A. Accordingly, cracks are unlikely to occur at the interface between the phase A and the phase B even when the volume of the alloy material expands during charge. Moreover, because the phase B has higher electron conductivity and is more rigid than the phase comprising Si simple substance, the phase B complements the low electron conductivity of the phase A, withstands the expansion stress and serves to retain the shape of the alloy particles. The phase B may comprise a plurality of phases. Also, the phase B may comprise two or more intermetallic compounds having different compositions. For example, both $MSi_2$ and $MSi$, where M represents a transition metal element, may be present in the alloy particles. Alternatively, intermetallic compounds containing different transition metal elements (e.g., $M^1Si_2$ and $M^2Si_2$ ($M^1 \neq M^2$)) may be present in the alloy particles.

Although the crystallinity of the phase A and/or the phase B is not specifically limited, preferably, the phase A and/or the phase B is amorphous or low crystalline. This is because cracking is unlikely to occur by the expansion resulting from the absorption of Li.

When the alloy material forming the phase A and/or the phase B is amorphous or low crystalline, the crystallite (grain) size is preferably not greater than 100 nm, and more preferably not less than 5 nm and not greater than 100 nm. When the crystallite size is larger than 100 nm, because the grain boundaries between crystallites decrease, the effect of preventing the particles from cracking becomes small. When the crystallite size is less than 5 nm, the grain boundaries between crystallites increase, which may lower the electron conductivity of the alloy. If the electron conductivity of the alloy decreases, the polarization of the negative electrode increases, resulting in low battery capacity.

The states of the phase A and the phase B that form the alloy material can be determined by X-ray diffractometry. Specifically, the alloy material is analyzed by X-ray diffractometry using a CuKα radiation at a diffraction angle of $2\theta = 10°$ to $80°$. Then, in the obtained diffraction spectrum, the presence of peaks that can be attributed to the crystal planes of the phase A and the phase B is checked.

When the phase A comprises Si, for example, a peak corresponding to the (111) crystal plane is observed at a diffraction angle of $2\theta = 28.4°$, a peak corresponding to the (220) crystal plane is observed at $47.3°$, a peak corresponding to the (311) crystal plane is observed at $56.1°$, a peak corresponding to the (400) crystal plane is observed at $69.1°$, a peak corresponding to the (331) crystal plane is observed at $76.4°$, which indicate the crystal planes of Si. The peak corresponding to the (111) crystal plane observed at a diffraction angle of $2\theta = 28.4°$ often has the highest intensity. When the phase comprises a microcrystalline region, however, a sharp peak is not observed, but a relatively broad peak is. When the alloy material comprises an amorphous region, on the other hand, in the diffraction spectrum of the alloy material obtained by X-ray diffractometry, a broad halo peak that is too broad to identify the half-width is observed.

The crystallite size can be determined by X-ray diffractometry. Specifically, from a diffraction spectrum of the alloy particles obtained by X-ray diffractometry, the half-width of a peak attributed to each phase is determined. The crystallite size can be calculated using the obtained half-width and the Scherrer equation. If a plurality of peaks that can be attributed to each phase are observed, the half-width of the peak that exhibits the highest intensity is determined, which is then applied to the Scherrer equation.

Using the Scherrer equation denoted by equation (1) given below, the crystallite size D can be determined. In the equation (1), $\lambda$=X-ray wavelength (nm) (in the case of CuK$\alpha$, 1.5405 nm), $\lambda$=a half-width of the peak obtained above (rad), and $\theta$=a half of the angle $2\theta$ of the peak obtained above (rad).

$$D \text{ (nm)} = 0.9 \times \lambda / (\beta \times \cos \theta) \quad (1)$$

Usually, a peak having the highest intensity that appears at a diffraction angle $2\theta$ of 10° to 80° is checked. It is preferred to check a peak having the highest intensity that appears at a diffraction angle $2\theta$ of 20° to 35°.

When the alloy material is analyzed by X-ray diffractometry using a CuK$\alpha$ radiation, in the obtained diffraction spectrum, a diffraction peak having the highest intensity observed at $2\theta$=10° to 80° or at $2\theta$=20° to 35° preferably has a half-width of 0.09° or greater. In this case, the crystallite size can be determined to 100 nm or less.

Besides the above method, the crystallite size can be directly measured by observing a cross section of the alloy particles obtained with the use of an atomic force microscope (AFM) or transmission electron microscope (TEM). The presence ratio (phase composition) of the phase A and the phase B contained in the alloy can be measured by energy-dispersive X-ray diffractometry (EDX) or energy-dispersive X-ray spectroscopy (EDS).

In the alloy material, the content of the phase A is preferably not less than 5 wt % and not greater than 95 wt % relative to the total weight of the phase A and the phase B. When the content of the phase A is higher, high capacity can be achieved effectively, but at the same time, the volume change during charge/discharge becomes large. Accordingly, it is possible to retain current collecting efficiency inside the electrode. From the viewpoint of keeping the cycle characteristics at a high level, the content of the phase A is preferably not greater than 80 wt %, and more preferably not greater than 50 wt %.

The transition metal element is at least one selected from the group consisting of Ti, Zr, Ni and Cu, and preferably, at least one selected from the group consisting of Ti and Zr. Silicides of these elements have higher electron conductivity and is more rigid than silicides of other elements. When the transition metal element is Ti, the phase B preferably comprises $TiSi_2$.

In the alloy material as described above, the transfer of alloy accompanied by the expansion of the phase A during the absorption of Li is blocked at the grain boundaries between crystallites. Accordingly, the occurrence of particle cracking is significantly suppressed. By suppressing the cracking of the alloy material serving as a negative electrode active material as described above, it is possible to provide a non-aqueous electrolyte secondary battery that degrades less during charge/discharge cycles.

A description is now given of Fe contained in the alloy material that is an important factor in the present invention.

The alloy material must contain Fe in a metallic state in an amount of 0.0006 to 1.0 wt %. As a result of detailed analysis conducted by the present inventors, they found that, when the amount of Fe in a metallic state is less than 0.0006 wt % in the alloy material, it results in degraded cycle characteristics. Presumably, this is because the Fe in a metallic state serves as a catalyst for inhibiting the formation of a coating film on the surface of the alloy material during charge/discharge, and functions to inhibit the formation of the coating film which serves as an excessively high resistance component. To this end, it is effective to incorporate Fe in a metallic state in an amount of 0.0006 wt % or more.

When the amount of Fe in a metallic state is greater than 1.0 wt %, the capacity recovery rate after storage in an overdischarged state will be low. The reason is presumed to be as follows. While the battery in an overdischarged state is stored, the negative electrode potential rises (due to electrochemical oxidation), the dissolution of Fe in a metallic state increases, raising the impedance of the battery, and resulting in degraded storage characteristics.

As stated above, Fe is an effective element for improving cycle characteristics, but when an excessive amount of Fe in a metallic state is present in the alloy material, it creates a negative effect: it degrades the storage characteristics in an overdischarged state as described previously.

Particularly, in order to keep cycle characteristics at a high level, it is important to make the phase A and the phase B to be amorphous or low crystalline. To achieve this, it is preferred to select mechanical synthesis to produce the alloy material. In mechanical synthesis, different metal elements are alloyed by mechanical impact energy, whereby it is possible to form an amorphous or low crystalline phase. The mechanical synthesis as described above induces extremely homogeneous reaction between the metal elements than conventional methods for producing alloy materials such as quenching method. In quenching method, because a molten alloy is solidified by rapid cooling, the reaction tends to be inhomogenerous or non-equilibrium. Accordingly, the mechanical synthesis is advantageous because it easily produces an amorphous or low crystalline phase and induces a homogeneous alloying reaction.

The Fe contained in the alloy material is difficult to detect by X-ray diffractometry or a transmission electron microscope (TEM) because its amount in the alloy material is very small.

For this reason, in order to determine in what state the Fe component is present in the alloy material, saturation magnetization measurement is performed. An example of saturation magnetization measurement given below uses a vibrating sample magnetometer (MODEL 7407 available from TOYO Corporation) as the measuring instrument.

The vibrating sample magnetometer vibrates a sample at a very small vibration amplitude of about 0.1 to 0.2 mm by a low frequency of about 80 Hz, and detects the electromotive force induced in the search coils, which are disposed near the magnetic poles of the electromagnet, due to a magnetic flux change with time caused by the magnetization of the sample during the vibration of the sample. Since the induced electromotive force is proportional to the magnetization, it is possible to measure the magnetization. The saturation magnetization is obtained by calculating M (magnetization) from the following equation:

$B = \mu_0 H + M$, where B represents a magnetic flux density, H represents a magnetic field, and $\mu_0$ represents a magnetic permeability of vacuum.

Then, the magnetic flux density (B) of the sample generated by the external magnetic field versus the magnetic field (H) is plotted.

Figure 2:
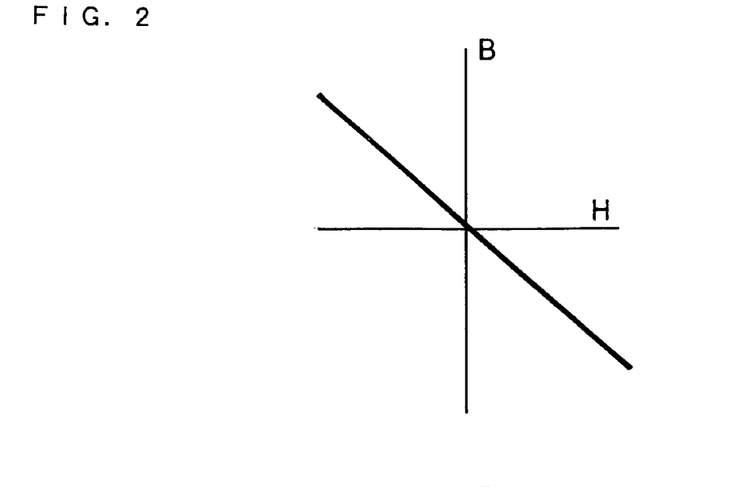
FIG. 2 is a graph showing an H-B curve of a diamagnetic material.
Figure 3:
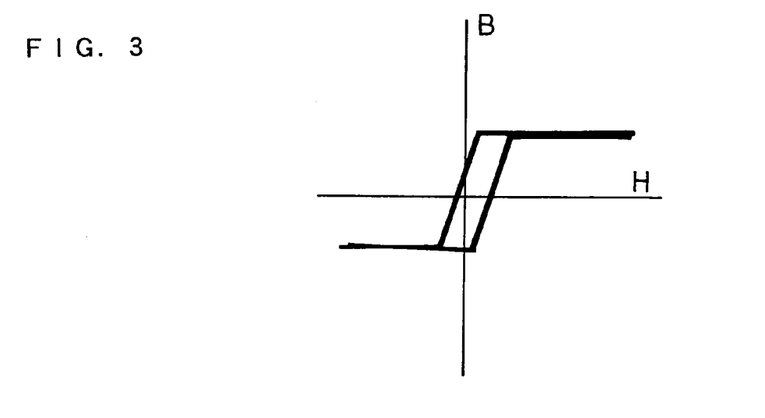
FIG. 3 is a graph showing an H-B curve of a ferromagnetic material.
Figure 4:
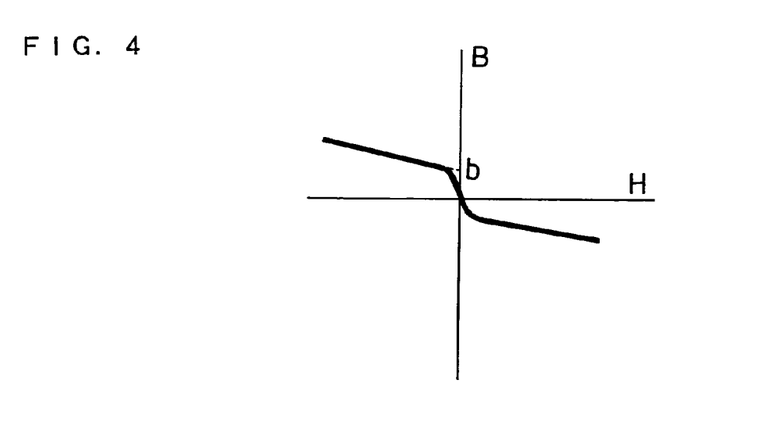
FIG. 4 is a graph showing an H-B curve of a mixture of a diamagnetic material and a ferromagnetic material.

Generally, when the sample is a diamagnetic material, a H-B curve as shown in FIG. 2 is obtained. When the sample is a ferromagnetic material, a H-B curve as shown in FIG. 3 is obtained. And, when the sample is a mixture of a diamagnetic material and a ferromagnetic material, a H-B curve as shown in FIG. 4 is obtained. A saturation magnetization can be determined from the point "b" where the extended line of the straight portion of the H-B curve shown in the left of FIG. 4 intersects with the B axis.

By previously obtaining the saturation magnetization of a reference sample containing metallic Fe, the amount of Fe in a metallic state contained in a sample can be determined from the saturation magnetization of the sample.

Specifically, the saturation magnetization of metallic Fe obtained by the above measurement is 150 emu/g (Fe). When the saturation magnetization of a sample is represented by M emu/g (sample), the amount of metallic Fe contained in the sample is about (M/150)×100 wt %.

Preferably, the alloy material has a saturation magnetization per gram of 0.001 to 1.7 emu/g.

The method for producing a negative electrode material for a non-aqueous electrolyte secondary battery of the present invention preferably detects a saturation magnetization of the negative electrode material which varies according to the amount of Fe, and terminates the synthesis of the negative electrode material when the detected saturation magnetization reaches a specified value. Particularly preferred is mechanical alloying method, in which a raw material containing Si and a raw material containing a transition metal are mixed and the mixture is subjected to mechanical alloying process, because the state of crystallites of each phase can be easily controlled.

Examples of the raw material for the alloy material and the raw material for the Fe contained in the alloy material include, but not limited to, simple substance, an alloy, a solid solution and an intermetallic compound. A specific example of the method for producing the Fe raw material is mechanical alloying. Besides mechanical alloying, any of the following methods can be used: casting, gas atomizing, liquid quenching, ion beam sputtering, vacuum vaporization, plating and chemical vapor deposition.

The state of the raw material for the negative electrode active material is not specifically limited as long as an intended component ratio can be achieved. Usable examples include a mixture of simple substances of elements for forming the negative electrode material mixed at an intended component ratio, and an alloy, solid solution or intermetallic compound having an intended component ratio.

Prior to the mechanical alloying process, an additional step may be performed in which a mixture of raw materials is melted and the molten mixture is then quenched to solidify it. However, in order to efficiently give the effect of combination (i.e., to finely grain the crystallites by mixing different elements) to a raw material containing Si, it is particularly preferred to mix a raw material containing Si and a raw material containing a transition metal element, and to subject the resulting mixture to mechanical alloying process.

Particularly preferably, a raw material containing Si and a raw material containing at least one selected from the transition metal elements mentioned above is first mixed, and a raw material containing Fe to be contained in the alloy material is added thereto. The resulting mixture is subjected to mechanical alloying process to produce the negative electrode material. This mechanical alloying is a preferred method for producing the negative electrode material because it is possible to easily control the state of crystallites of each phase. Prior to the mechanical alloying process, additional steps may be performed: a step of melting the mixture, and a step of solidifying the molten mixture by rapid cooling to form a solid.

Because the above method using mechanical alloying process is performed in a dry atmosphere, the resulting particles can have a wide range of size distribution. For this reason, after the synthesis, a pulverization process or sizing process may be performed to obtain alloy particles of a uniform size.

The pulverizer can be a conventional one such as an attritor, vibration mill, ball mill, planetary ball mill, bead mill or jet mill.

The negative electrode of the present invention can further optionally contain a conductive material in addition to the alloy material. Examples of the conductive material include: graphites such as natural graphite (e.g., flake graphite), artificial graphite and expanded graphite; carbon blacks such as acetylene black, ketjen black, channel black, furnace black, lamp black and thermal black; conductive fibers such as carbon fiber, carbon nanotube and metal fiber; metal powders such as a copper powder and a nickel powder; and conductive organic materials such as a polyphenylene sulfide derivative. They may be used singly or in any combination thereof. Among the above, it is preferred to use graphites in terms of density, capacity and stability for electrolytes.

When the conductive material is added to the negative electrode, the amount of the conductive material is preferably, but not limited to, 1 to 50 parts by weight relative to 100 parts by weight of the alloy material, and more preferably, 1 to 40 parts by weight. Note that because the alloy material according to the present invention itself is electron conductive, a negative electrode that functions sufficiently can be obtained without the use of the conductive material.

The negative electrode can be produced by, for example, mixing the alloy material and optionally the conductive material, a binder and a dispersing medium to prepare a negative electrode material mixture, which is then formed into a pellet or the like or applied onto a current collector, followed by drying.

The binder is preferably a material that is electrochemically inactive to Li in an operating potential range of the negative electrode and least affects other substances. Preferred examples include styrene-butadiene copolymer rubber, polyacrylic acid, polyethylene, polyurethane, polymethyl methacrylate, polyvinylidene fluoride, polytetrafluoroethylene, carboxymethyl cellulose and methylcellulose. Because the negative electrode used in the present invention undergoes a large volume change during charge, preferred are styrene-butadiene copolymer rubber which is relatively adaptable to the volume change and polyacrylic acid which can retain a strong binding state even when the volume change occurs. As for the amount of the binder, the larger the amount, the more preferred, from the viewpoint of retaining the structure of the negative electrode. From the viewpoint of improving the battery capacity and the discharge characteristics, the amount is preferably small.

The non-aqueous electrolyte secondary battery of the present invention comprises the negative electrode as described above, a positive electrode capable of electrochemically absorbing and desorbing Li, and a non-aqueous electrolyte.

The non-aqueous electrolyte may be a gel electrolyte or solid electrolyte. Usually, an electrolyte solution comprising a non-aqueous solvent and a solute dissolved in the solvent is used. Examples of the non-aqueous solvent include: cyclic carbonates such as ethylene carbonate, propylene carbonate, butylene carbonate and vinylene carbonate; chain carbonates such as dimethyl carbonate, diethyl carbonate, ethyl methyl carbonate and dipropyl carbonate; aliphatic carboxylic acid esters such as methyl formate, methyl acetate, methyl propionate and ethyl propionate; γ-lactones such as γ-butyrolactone; chain ethers such as 1,2-dimethoxyethane, 1,2-diethoxyethane and ethoxymethoxyethane; cyclic ethers such as tetrahydrofuran and 2-methyltetrahydrofuran; and aprotic organic solvents such as dimethyl sulfoxide, 1,3-dioxolane, formamide, acetamide, dimethylformamide, dioxolane, acetonitrile, propylnitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethylether, 1,3-propanesultone, anisole, dimethyl sulfoxide, N-methylpyrrolidone, butyl diglyme and methyl tetraglyme. Preferably, two or more of the above-listed compounds are used together.

Examples of the solute dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, lithium tetrachloroborate, lithium tetraphenylborate and imides. They may be used singly or in any combination of two or more. The amount of the solute dissolved in the non-aqueous solvent is preferably, but not limited to, 0.2 to 2.0 mol/L, and more preferably 0.5 to 1.5 mol/L.

The positive electrode is not specifically limited as long as conventionally proposed positive electrodes for non-aqueous electrolyte secondary batteries are used. The positive electrode typically comprises a positive electrode active material, a conductive material and a binder. Although the positive electrode active material is not specifically limited as long as conventionally proposed positive electrode active materials for non-aqueous electrolyte secondary batteries are used, it is preferred to use a lithium-containing transition metal compound. Examples of the lithium-containing transition metal compound include, but not limited to, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiCo_{1-x}Mg_xO_2$, $LiN_{1-y}Co_yO_2$ and $LiNi_{1-y-z}Co_yMn_zO_2$. In the above-listed lithium-containing transition metal compounds, M is at least one selected from the group consisting of Na, Mg, Sc, Y, Mn, Fe, Co, Ni, Cu, Zn, Al, Cr, Pb, Sb and B, and x=0 to 1.2, y=0 to 0.9 and z=2.0 to 2.3. The value of x varies by charge and discharge of the battery. It is also possible to use a transition metal chalcogenide, vanadium oxide and its lithium compound, niobium oxide and its lithium compound, conjugated polymer containing an organic conductive substance or Chevrel-phase compound as the positive electrode active material. Two or more of the above active materials can be used together.

A separator interposed between the positive and negative electrodes is usually a microporous electron-insulating thin film having high ion permeability and specified mechanical strength. Preferably used is a microporous thin film made of polypropylene, polyethylene, polyphenylene sulfide, polyethylene terephthalate, polyamide or polyimide because these materials have excellent resistance to non-aqueous solvents and high hydrophobicity. These materials may be used singly or in any combination of two or more. To reduce production costs, it is advantageous to use polypropylene because it is inexpensive. To impart reflow resistance to the battery, it is preferred to use polyethylene terephthalate, polyamide or polyimide having a thermal deformation temperature of 230° C. or greater. A sheet, non-woven fabric or woven fabric made of glass fiber can also be used. Typically, the thickness of a separator is 10 to 300 μm. The porosity is determined according to the electron conductivity, the ion permeability, the component material, etc. Preferably, the porosity is 30 to 80%.

The present invention is applicable to non-aqueous electrolyte secondary batteries of any shape such as cylindrical, flat, coin-type and prismatic, and the battery shape is not specifically limited. The present invention is applicable to batteries produced by housing a power generating element (i.e., electrodes, electrolyte solution) into a metal battery can or a case made of a laminate film, which is sealed by a sealing means. The sealing means is not specifically limited.

The non-aqueous electrolyte secondary battery according to one embodiment of the present invention is a coin-type non-aqueous electrolyte secondary battery in which a negative electrode can and a positive electrode can are combined with a gasket interposed therebetween. A preferred method for producing such battery is described below. First, a positive electrode pellet comprising a positive electrode material mixture containing a positive electrode active material capable of absorbing and desorbing lithium ions is placed in a positive electrode can. A negative electrode pellet comprising a negative electrode material mixture including the alloy material containing Si is placed in a negative electrode can. Subsequently, a separator is placed on the positive electrode pellet. A lithium ion conductive non-aqueous electrolyte solution is then impregnated into the negative electrode pellet, the positive electrode pellet and the separator. Thereafter, the negative electrode can and the positive electrode can are combined with a gasket placed around and between the positive and negative electrode cans, after which the positive electrode can and the negative electrode can are engaged for sealing by crimping the edge of the opening of the positive electrode can onto the periphery of the negative electrode can with the gasket therebetween.

Hereinafter, the present invention will be described in further detail with reference to examples and comparative examples. The examples given below should be construed merely as exemplifications of preferred embodiments of the present invention, and the present invention is not limited to the examples given below.

Example 1

In EXAMPLE 1 and COMPARATIVE EXAMPLE 1, investigations were made on negative electrode materials containing various transition metals for forming the phase B and negative electrode materials containing non-metallic Fe.

Coin-type batteries were assembled using negative electrodes and positive electrodes produced in the following manner. The produced batteries were evaluated in terms of cycle life, discharge capacity and storage characteristics in an over-discharged state.

(1) Production of Alloy Material

As the raw material for transition metal element M, metallic Ti, metallic Zr, metallic Ni and metallic Cu were used. They all had a purity of 99.9% and were in the form of a powder with a particle size of 100 to 150 μm. As the raw material for Si, Si powder (purity: 99.9%, average particle size: 3 μm) was used.

On the assumption that the phase B would comprise $MSi_2$, each transition metal and Si were mixed such that the content of the phase A would be 20% relative to the total weight of the phase A and the phase B in the resulting alloy material.

As the raw material for Fe element, metallic Fe powder having a purity of 99.9% and an average particle size of 100 μm was used.

The Fe powder was mixed with the above mixture of transition metal and Si such that the amount of Fe contained in the resulting mixture would be 0.001 wt %.

The resulting mixture was weighed to 3.5 kg and then introduced into a container of a vibration mill (Model FV-20 manufactured by Chuo Kakohki Co., Ltd.). Then, stainless steel balls (diameter: 2 cm) were introduced into the container so that the stainless steel balls accounted for 70 vol % of the capacity of the mill. The container was evacuated to a vacuum, after which argon gas (purity: 99.999%, available from Nippon Sanso Corporation) was introduced into the container. The pressure of the container was then adjusted to 1 atmosphere. The vibration mill was operated at a vibration amplitude of 8 mm and a rotation rate of 1200 rpm. Under the conditions, mechanical alloying was performed for 80 hours.

Each of the four different alloys obtained in the above-described manner was collected and then analyzed by X-ray diffractometry using a CuKα radiation. In the case of a Ti—Si alloy, a spectrum indicating the microcrystalline state was obtained. Using the half-width of the diffraction peak having the highest intensity observed at 2θ=10° to 80° and the Scherrer equation, the crystallite (grain) size of the alloy was calculated. The alloy had a crystallite size of about 10 nm.

From the results of the X-ray diffractometry, it was surmised that a phase (phase A) comprising Si simple substance and a phase (phase B) comprising $TiSi_2$ were present in the Ti—Si alloy. On the assumption that these two phases were the main phases present in the alloy, the ratio of the phase comprising Si simple substance and the phase comprising $TiSi_2$ was calculated. As a result, the weight ratio Si:$TiSi_2$ was 20:80.

In the same manner as above, the crystallite size and the weight ratio of phase A to phase B for the other three alloys were determined, and similar results to that of Ti—Si alloy were obtained.

Subsequently, a cross section of the Ti—Si alloy was observed by a transmission electron microscope (TEM), and it was found that an amorphous region, Si simple substance phase comprising crystal grains (crystallites) having a size of about 10 nm, and $TiSi_2$ phase comprising crystal grains (crystallites) having a size of about 15 to 20 nm were present. The other three alloys were also subjected to the same measurement, and similar results to that of Ti—Si alloy were obtained.

In order to obtain the amount of metallic Fe contained in the alloy materials, the amount of Fe in a metallic state contained in each alloy material was determined by measuring the saturation magnetization. As a result, all of the alloy materials of this example contained 0.001 wt % of Fe in a metallic state.

(2) Production of Negative Electrode

Negative electrodes were produced in the following manner using the alloys produced above, graphite and a binder.

A negative electrode material mixture was prepared by mixing each of the alloys, graphite (SP-5030 available from Nippon Graphite Industry Co. Ltd.) and polyacrylic acid (average molecular weight: 150000, available from Wako Pure Chemical Industries, Ltd.) as a binder at a weight ratio of 70.5:21.5:7. This negative electrode material mixture was formed into a pellet having a diameter of 4 mm and a thickness of 0.3 mm. The pellet was then dried at 200° C. for 12 hours. The dried pellet had a thickness of 300 μm, a porosity of 26.6% and a density of 1.721 g/cm³.

(3) Production of Positive Electrode

A mixture of manganese dioxide and lithium hydroxide mixed at a ratio of 2:1 was baked at 400° C. in the air for 12 hours to prepare lithium manganese oxide.

The obtained lithium manganese oxide was mixed with carbon black as a conductive material and polytetrafluoroethylene as a binder at a weight ratio of 88:6:6 to prepare a positive electrode material mixture. The binder was used in the state of aqueous dispersion. This positive electrode material mixture was formed into a pellet having a diameter of 4 mm and a thickness of 1.0 mm. The pellet was then dried at 250° C. for 12 hours.

(4) Production of Coin-type Battery

Figure 1:
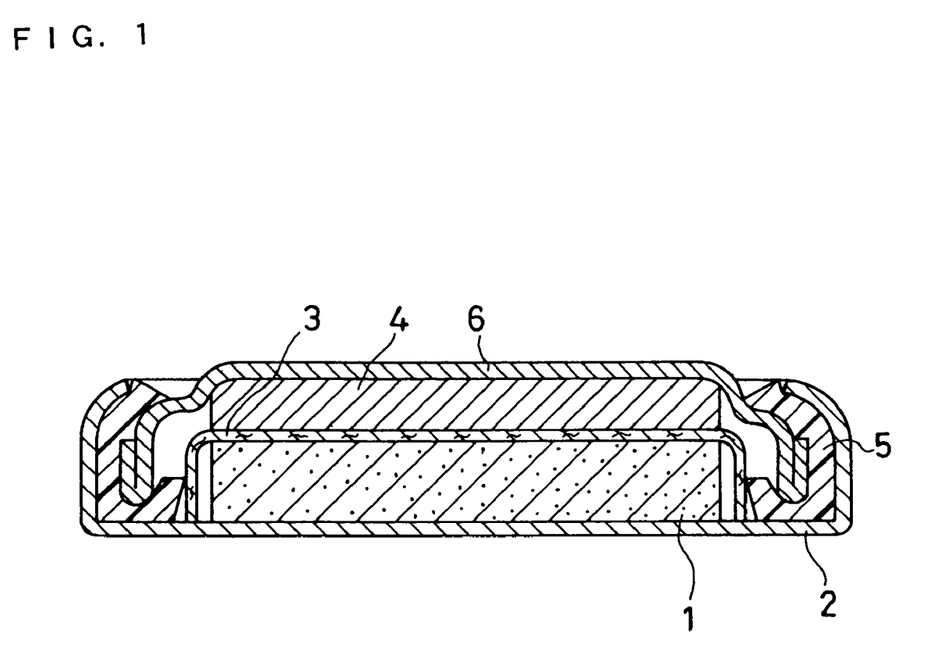
FIG. 1 is a vertical cross sectional view of a coin type non-aqueous electrolyte secondary battery according to an embodiment of the present invention.

Using the positive and negative electrode material mixture pellets produced above, coin-type non-aqueous electrolyte secondary batteries having an outer diameter of 6.8 mm and a thickness of 2.1 mm as shown in FIG. 1 were assembled.

A positive electrode can 2 serving as a positive electrode terminal was made of highly corrosion resistant stainless steel. In the bottom of the positive electrode can 2 was placed the above-produced positive electrode material mixture pellet 1. A negative electrode can 6 serving as a negative electrode terminal was made of the same stainless steel as the positive electrode can 2. In the bottom of the negative electrode can 6 was placed the above-produced negative electrode material mixture pellet 4. A gasket 5 for insulating the positive electrode can 2 and the negative electrode can 6 from each other was made of polypropylene. A pitch was applied onto the contact face between the positive electrode can 2 and the gasket 3 and the contact face between the negative electrode can 6 and the gasket 3.

A separator 3 made of a polyethylene non-woven fabric was interposed between the positive electrode material mixture pellet 1 and the negative electrode material mixture pellet 4. An electrolyte solution prepared by dissolving $LiN(CF_3SO_2)_2$ in a solvent mixture of propylene carbonate, ethylene carbonate and 1,2-dimethoxyethane at a volume ratio of 1:1:1 at a $LiN(CF_3SO_2)_2$ concentration of 1 mol/l was used.

Comparative Example 1

Each of the same mixtures containing raw materials for transition metal, Si and Fe as used in EXAMPLE 1 was placed in a melting furnace and melted at 1400° C. in an inert gas atmosphere. The molten mixture was rapidly cooled by roll quenching to form a solid. The resulting solid was heated at 500° C. in an inert gas atmosphere for 20 hours, which was then pulverized in a ball mill and sized into particles of not greater than 45 μm using a sieve. Thereby, negative electrode materials were obtained.

Each of these negative electrode materials was analyzed by X-ray diffractometry and observation using a TEM. It was found that the negative electrode materials each comprised a phase comprising Si single substance and a phase comprising $MSi_2$ (M=Ti, Zr, Ni or Cu), both phases comprising crystallites having a size of about 100 nm.

In order to determine the amount of metallic Fe contained in the alloy materials, the negative electrode materials were analyzed for saturation magnetization. As a result, no Fe in a metallic state was observed. Inductively coupled plasma (ICP) emission spectrometry, on the other hand, indicated the same amount of Fe as was added. Accordingly, it was found that the alloys synthesized by quenching contained non-metallic Fe. Further, the results of X-ray diffractometry and observation using a transmission electron microscope (TEM) showed that the phase comprising Si and the phase comprising $MSi_2$ were highly crystalline with a crystallite size of about 100 nm.

(5) Evaluation of Battery

In a thermostatic chamber set at 20° C., each of the batteries of EXAMPLE 1 and COMPARATIVE EXAMPLE 1 was subjected to 200 constant current charge/discharge cycles with a charge current of 2 C (an hour rate of 1 C), a discharge current of 0.2 C and a battery voltage range of 2.0 to 3.3 V. The discharge capacity at the second cycle was denoted as "initial discharge capacity". The rate of discharge capacity at the 200th cycle to that at the second cycle was determined in percentage (%), which was denoted as "capacity retention rate". As the capacity retention rate approaches to 100(%), it indicates that the cycle life is better.

After the above charge/discharge cycle was repeated five times, the battery was discharged at a discharge current of 0.2 C until the battery voltage reached 0 V, which was then stored in a thermostatic chamber set at 60° C. for 100 days with the terminals of the battery short-circuited. Subsequently, the battery was further subjected to 100 charge/discharge cycles in a thermostatic chamber set at 2° C. with a charge current of 0.2 C, a discharge current of 0.2 C and a battery voltage range of 2.0 to 3.3 V, after which the discharge capacity was measured. A percentage of the discharge capacity after storage to that before storage was denoted as "capacity recovery rate".

The initial discharge capacity, the capacity retention rate and the capacity recovery rate are shown in Table 1 where Sample Nos. 1-1 to 1-4 correspond to EXAMPLE 1, and Sample Nos. 11-1 to 11-4 correspond to COMPARATIVE EXAMPLE 1.

TABLE 1

| Sample No. | Phase B | Initial discharge capacity (mAh) | Capacity retention rate (%) | Capacity recovery rate (%) |
| --- | --- | --- | --- | --- |
| 1-1 | TiSi$_2$ | 6.0 | 95 | 95 |
| 1-2 | ZrSi$_2$ | 5.9 | 90 | 90 |
| 1-3 | NiSi$_2$ | 5.9 | 90 | 90 |
| 1-4 | CuSi$_2$ | 5.8 | 88 | 88 |
| 11-1 | TiSi$_2$ | 6.0 | 75 | 95 |
| 11-2 | ZrSi$_2$ | 5.9 | 70 | 90 |
| 11-3 | NiSi$_2$ | 5.9 | 70 | 90 |
| 11-4 | CuSi$_2$ | 5.8 | 68 | 88 |

As is clear from Table 1, the batteries of EXAMPLE 1 exhibited higher capacity retention rate at the 200th cycle than those of COMPARATIVE EXAMPLE 1. As for the capacity recovery rate after storage in an overdischarged state, the batteries of EXAMPLE 1 and COMPARATIVE EXAMPLE 1 exhibited similar levels.

Although the mechanism by which Fe in a metallic state improves cycle characteristics is not clearly known, presumably, the Fe serves as a catalyst for inhibiting the formation of a coating film on the alloy material surface during charge, and prevents an excessive increase in impedance during charge/discharge cycles.

It was also found that the amount of Fe in a metallic state contained in the batteries of EXAMPLE 1 does not negatively affect the capacity recovery rate after storage in an overdischarged state.

Example 2

In EXAMPLE 2 and COMPARATIVE EXAMPLE 2, investigations were made on the effect offered by the addition of Fe in a metallic state using alloy materials containing various transition metals, alloy materials having high crystallinity and alloy materials having low crystallinity.

In the same manner as in EXAMPLE 1, alloy materials (Sample Nos. 2-1 to 2-4) comprising Si phase (phase A) and MSi$_2$ phase (phase B) (M=Ti, Zr, Ni or Cu) and containing 0.001 wt % of Fe were prepared. In each alloy material, the phase A and the phase B had a crystallite size of about 10 nm and about 15 nm, respectively.

A highly crystalline alloy material, in other words, an alloy material having a large crystallite size was prepared by reducing the mechanical alloying time to 40 hours. The resulting alloy material (Sample No. 2-5) comprised Si phase (phase A) and TiSi$_2$ phase (phase B) both having a crystallite size of 100 nm.

Comparative Example 2

Low crystalline alloy materials (Sample Nos. 12-1 to 12-4) (comprising Si phase and MSi$_2$ phase (M=Ti, Zr, Ni or Cu) as well as a highly crystalline alloy material (Sample No. 12-5) comprising Si phase (A phase) and TiSi$_2$ phase (B phase) were produced in the same manner as in EXAMPLE 2 except that Fe was not added to the raw material.

Using the alloy materials of EXAMPLE 2 and COMPARATIVE EXAMPLE 2, negative electrodes were produced. Then, batteries were assembled in the same manner as in EXAMPLE 1 using the negative electrodes. Evaluation was made in the same manner as described above. The results are shown in Tables 2 and 3.

TABLE 2

| Sample No. | Phase B | Initial discharge capacity (mAh) | Capacity retention rate (%) | Capacity recovery rate (%) |
| --- | --- | --- | --- | --- |
| 2-1 | TiSi$_2$ | 6.0 | 95 | 95 |
| 2-2 | ZrSi$_2$ | 5.9 | 90 | 90 |
| 2-3 | NiSi$_2$ | 5.9 | 90 | 90 |
| 2-4 | CuSi$_2$ | 5.8 | 88 | 88 |
| 12-1 | TiSi$_2$ | 6.0 | 85 | 95 |
| 12-2 | ZrSi$_2$ | 5.9 | 80 | 90 |
| 12-3 | NiSi$_2$ | 5.9 | 80 | 90 |
| 12-4 | CuSi$_2$ | 5.8 | 78 | 88 |

TABLE 3

| Sample No. | Crystallite size (nm) Phase A | Crystallite size (nm) Phase B | Amount of metallic Fe (wt %) | Initial discharge capacity (mAh) | Capacity retention rate (%) | Capacity recovery rate (%) |
| --- | --- | --- | --- | --- | --- | --- |
| 2-1 | 10 | 15 | 0.001 | 6 | 95 | 95 |
| 2-5 | 100 | 100 | 0.001 | 6 | 80 | 90 |
| 12-1 | 10 | 15 | 0 | 6 | 85 | 95 |
| 12-5 | 100 | 100 | 0 | 6 | 60 | 90 |

The batteries of EXAMPLE 2 exhibited higher capacity retention rate at the 200th cycle than those of COMPARATIVE EXAMPLE 2. As for the capacity recovery rate after storage in an overdischarged state, the batteries of EXAMPLE 2 and COMPARATIVE EXAMPLE 2 exhibited similar levels. Moreover, as can be seen from Table 3, even in highly crystalline alloys, the addition of Fe in a metallic state is effective in improving cycle characteristics.

It was also found that the amount of Fe in a metallic state contained in the batteries of EXAMPLE 2 does not negatively affect the capacity recovery rate after storage.

Example 3

Investigations were made on the amount of Fe contained in the alloy material and the saturation magnetization of the alloy material.

Alloy materials comprising a phase A (Si phase) and a phase B at a weight ratio of 20:80 and containing 0.0003 to 2.0 wt % of Fe were prepared in the same manner as in EXAMPLE 1 except that the amount of Fe added to the raw material was changed. The resulting alloy material particles were sized into an average particle size of 5 μm with the maximum particle size of 8 μm.

Using the half-width of a peak having the highest intensity obtained by X-ray diffractometry for each alloy material and the Scherrer equation, the crystallite size of phase A was calculated in the same manner as in EXAMPLE 1.

In the case of Ti—Si alloy materials, for example, the presence of a phase comprising Si simple substance comprising crystal grains (crystallites) having a size of about 10 nm and a phase comprising $TiSi_2$ comprising crystal grains (crystallites) having a size of about 15 to 20 nm was observed. Similar results were obtained for other three different alloy materials.

In the same manner as in EXAMPLE 1, the amount of Fe in a metallic state was determined from the saturation magnetization. Negative electrodes were produced in the same manner as in EXAMPLE 1 using the above alloy materials. Then, batteries were assembled using the negative electrodes. The evaluation results for these batteries are shown in Table 4.

TABLE 4

| Phase B | Amount of metallic Fe (wt %) | Saturation magnetization (emu/g) | Initial discharge capacity (mAh) | Capacity retention rate (%) | Capacity recovery rate (%) |
|---|---|---|---|---|---|
| $TiSi_2$ | 0.0003 | 0.00051 | 5.5 | 70 | 90 |
| | 0.0006 | 0.00102 | 5.9 | 95 | 90 |
| | 0.01 | 0.017 | 6 | 93 | 90 |
| | 1 | 1.7 | 6 | 90 | 88 |
| | 2 | 3.4 | 6 | 90 | 70 |
| $ZrSi_2$ | 0.0003 | 0.00051 | 5.5 | 70 | 90 |
| | 0.0006 | 0.00102 | 5.9 | 95 | 90 |
| | 0.01 | 0.017 | 6 | 93 | 90 |
| | 1 | 1.7 | 6 | 90 | 88 |
| | 2 | 3.4 | 6 | 90 | 70 |
| $NiSi_2$ | 0.0003 | 0.00051 | 5.5 | 70 | 90 |
| | 0.0006 | 0.00102 | 5.9 | 95 | 90 |
| | 0.01 | 0.017 | 6 | 93 | 90 |
| | 1 | 1.7 | 6 | 90 | 88 |
| | 2 | 3.4 | 6 | 90 | 70 |
| $CuSi_2$ | 0.0003 | 0.00051 | 5.5 | 70 | 90 |
| | 0.0006 | 0.00102 | 5.9 | 95 | 90 |
| | 0.01 | 0.017 | 6 | 93 | 90 |
| | 1 | 1.7 | 6 | 90 | 88 |
| | 2 | 3.4 | 6 | 90 | 70 |

As can be seen from Table 4, high capacity retention rate and excellent capacity recovery rate after storage are achieved when 0.0006 to 1.0 wt % of Fe in a metallic state is contained in the alloy material.

Specifically, the batteries containing Fe in a metallic state in an amount less than 0.0006 wt % in the alloy material exhibited poor cycle characteristics. It is surmised that the Fe in a metallic state serves as a catalyst for inhibiting the formation of a coating film on the surface of the alloy material during charge/discharge, and functions to inhibit the formation of the coating film which will serve as an excessively high resistance component. For this purpose, it is effective that the alloy material contain Fe in a metallic state in an amount of 0.0006 wt % or more. Further, the batteries containing Fe in a metallic state in an amount greater than 1.0 wt % exhibited poor capacity recovery rate after storage in an overdischarged state. This is presumably because since the negative electrode potential rises (due to electrochemical oxidation) during over-discharge, while the battery having the increased negative electrode potential is stored for a long period of time, the dissolution of Fe in a metallic state increases, raising the impedance of the battery, and resulting in poor storage characteristics.

Example 4

In this example, investigations were made on the content of the phase containing Si.

Ti—Si alloys, Zr—Si alloys, Ni—Si alloys and Cu—Si alloys as shown in Table 5 were prepared in the same manner as in EXAMPLE 1 except that the weight ratio of phase A and phase B were changed to 1:99 to 98:2. The amount of Fe added was 0.001 wt %. The obtained alloy materials were sized into an average particle size of 5 μm with the maximum particle size of 8 μM.

Using the half-width of a peak having the highest intensity obtained by X-ray diffractometry for each alloy material and the Scherrer equation, the crystallite sizes of the phase A and the phase B were calculated in the same manner as in EXAMPLE 1. As a result, in all of the alloy materials, the presence of a phase comprising Si simple substance comprising crystal grains (crystallites) having a size of about 10 nm and a phase comprising $MSi_2$ comprising crystal grains (crystallites) having a size of about 15 to 20 nm was observed.

The amount of Fe in a metallic state was measured, and it was found that all of the alloy materials contained 0.001 wt % of Fe in a metallic state.

Negative electrodes were produced in the same manner as in EXAMPLE 1 using the alloy materials prepared above. Then, batteries were assembled using the negative electrodes. Table 5 shows the battery performance for these batteries.

TABLE 5

| | | Content of phase A (wt %) | 1 | 5 | 20 | 30 | 40 | 50 | 60 | 70 | 80 | 95 | 98 |
|---|---|---|---|---|---|---|---|---|---|---|---|---|---|
| Phase B | $TiSi_2$ | Initial discharge capacity (mAh) | 4.0 | 5.5 | 6.0 | 6.0 | 6.1 | 6.1 | 6.1 | 6.1 | 6.1 | 6.1 | 6.2 |
| | | Capacity retention rate (%) | 85 | 95 | 95 | 95 | 95 | 95 | 93 | 93 | 92 | 90 | 85 |
| | | Capacity recovery rate (%) | 85 | 95 | 95 | 95 | 95 | 95 | 93 | 93 | 92 | 90 | 85 |
| | $ZrSi_2$ | Initial discharge capacity (mAh) | 3.9 | 5.4 | 5.9 | 5.9 | 6.0 | 6.0 | 6.0 | 6.0 | 6.0 | 6.0 | 3.9 |
| | | Capacity retention rate (%) | 80 | 90 | 90 | 90 | 90 | 90 | 88 | 88 | 87 | 85 | 80 |
| | | Capacity recovery rate (%) | 80 | 90 | 90 | 90 | 90 | 90 | 88 | 88 | 87 | 85 | 80 |
| | $NiSi_2$ | Initial discharge capacity (mAh) | 3.9 | 5.4 | 5.9 | 5.9 | 6.0 | 6.0 | 6.0 | 6.0 | 6.0 | 6.0 | 3.9 |
| | | Capacity retention rate (%) | 80 | 90 | 90 | 90 | 90 | 90 | 88 | 88 | 87 | 85 | 80 |
| | | Capacity recovery rate (%) | 80 | 90 | 90 | 90 | 90 | 90 | 88 | 88 | 87 | 85 | 80 |
| | $CuSi_2$ | Initial discharge capacity (mAh) | 3.8 | 5.3 | 5.8 | 5.8 | 5.9 | 5.9 | 5.9 | 5.9 | 5.9 | 5.9 | 3.8 |
| | | Capacity retention rate (%) | 78 | 88 | 88 | 88 | 88 | 88 | 86 | 86 | 85 | 84 | 78 |
| | | Capacity recovery rate (%) | 78 | 88 | 88 | 88 | 88 | 88 | 86 | 86 | 85 | 84 | 78 |

As can be seen from Table 5, high capacity retention rate and excellent capacity recovery rate are achieved when the content of the Si phase (phase A) is 5 to 95 wt %.

When the content of Si phase was less than 5 wt %, the capacity degraded significantly as the charge/discharge cycles proceeded. The reason is presumably because the amount of Si that contributes to the capacity was too small, and the current density of the Si phase during charge/discharge cycles was excessively high. Further, even when the amount of Fe in a metallic state is equal, the battery having a low content of Si phase is relatively susceptible to the influence of dissolved Fe. For this reason, the capacity recovery rate was poor.

In contrast, when the content of Si phase is higher than 95 wt %, although the capacity increases, the Si phase having low electron conductivity increases in the alloy material. Accordingly, the electron conductivity of the entire alloy material becomes low, which is disadvantageous in collecting current during charge/discharge cycles. Since the impedance of the battery is inherently large, there is no leeway for the increase in impedance during discharge. As a result, the capacity recovery rate becomes poor.

Example 5

In this example, a method for producing the alloy material according to the present invention is described.

A feature of the synthesizing method of the present invention is to detect a saturation magnetization of the alloy material that varies according to the amount of Fe in a metallic state, and to terminate the synthesis when the detected saturation magnetization reaches a specified value.

As the raw material for transition metal element M, metallic Ti (purity: 99.9%, particle size: 100 to 150 µm) was used. As the raw material for Si, Si powder (purity: 99.9%, average particle size: 3 µm) was used. On the assumption that the phase B would comprise $TiSi_2$, the metallic Ti and the Si powder were mixed such that the content of the phase A would be 20% relative to the total weight of the phase A and the phase B in the resulting alloy material.

As the raw material for Fe element, metallic Fe powder having a purity of 99.9% and an average particle size of 100 µm was used.

The Fe powder was mixed with the above mixture of Ti and Si such that the amount of Fe contained in the resulting mixture would be 2.0 wt %.

In the same manner as in EXAMPLE 1, this raw material mixture was weighed to 3.5 kg and then introduced into a container of a vibration mill (Model FV-20 manufactured by Chuo Kakohki Co., Ltd.). Then, stainless steel balls (diameter: 2 cm) were introduced into the container so that the stainless steel balls accounted for 70 vol % of the capacity of the mill. The container was evacuated to a vacuum, after which Ar (purity: 99.999%, available from Nippon Sanso Corporation) was introduced into the container. The pressure of the container was then adjusted to 1 atmosphere. The vibration mill was operated at a vibration amplitude of 8 mm and a rotation rate of 1200 rpm. Under the conditions, mechanical alloying was performed for 80 hours. A sample was collected every 10 hours after the start of the synthesis to determine the saturation magnetization. The results are shown in Table 6.

TABLE 6

| Synthesis time (hr) | 0 | 10 | 20 | 30 | 40 | 50 | 60 | 70 | 80 |
|---|---|---|---|---|---|---|---|---|---|
| Saturation magnetization (emu/g) | 2.0 | 2.0 | 1.9 | 1.7 | 0.5 | 0.001 | 0.0005 | 0.0005 | 0.0005 |

Thirty hours after the start of the synthesis, the saturation magnetization reached 1.7 emu/g. Referring back to the results of EXAMPLE 3, this value obviously falls within a range where excellent capacity recovery rate after storage in an overdischarged state was achieved. The saturation magnetization decreased as increasing synthesis time. Fifty hours after the start of the synthesis, the saturation magnetization reached 0.001 emu/g. Referring again to the results of EXAMPLE 3, when the saturation magnetization was lower than 0.001 emu/g, the cycle characteristics were poor. Considering the foregoing, an appropriate synthesis time is 30 to 50 hours.

As described above, by detecting the saturation magnetization of the alloy material during the synthesis, it is possible to synthesize a material having excellent cycle characteristics and excellent storage characteristics in an overdischarged state.

The present invention provides a non-aqueous electrolyte secondary battery particularly suitable for use as main power sources for electronic devices such as cell phones and digital cameras as well as for use as memory backup batteries. The non-aqueous electrolyte secondary battery according to the present invention is also applicable to applications that require high electric capacity and excellent cycle characteristics. Even in such applications, the non-aqueous electrolyte secondary battery of the present invention exhibits excellent capacity recovery rate after storage in an overdischarged state.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a negative electrode material for a non-aqueous electrolyte secondary battery comprising a step of producing an alloy material using a raw material containing Si, Fe and at least one transition metal element selected from the group consisting of Ti, Zr, Ni and Cu, said alloy material including a phase (phase A) comprising at least Si and a phase (phase B) comprising an intermetallic compound composed of Si and said at least one transition metal element, and containing Fe in a metallic state,
   wherein a saturation magnetization of said alloy material which varies according to the amount of Fe is detected during said step, and
   said step is terminated when the detected saturation magnetization reaches a specified value.

2. The method for producing a negative electrode material for a non-aqueous electrolyte secondary battery in accordance with claim 1,
   wherein said step comprises a mechanical alloying process.

* * * * *